(12) United States Patent
Kim et al.

(10) Patent No.: US 8,174,564 B2
(45) Date of Patent: May 8, 2012

(54) THREE-DIMENSIONAL DISPLAY DEVICE (75) Inventors: Beom-Shik Kim, Yongin-si (KR); Jang-Doo Lee, Yongin-si (KR); Hyoung-Wook Jang, Yongin-si (KR); Hui Nam, Yongin-si (KR); Myoung-Seop Song, Yongin-si (KR); Ja-Seung Ku, Yongin-si (KR); Hyo-Jin Lee, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 1563 days.

(21) Appl. No.: 11/604,973

(22) Filed: Nov. 27, 2006

(65) Prior Publication Data

US 2007/0120973 A1 May 31, 2007

(30) Foreign Application Priority Data

Nov. 30, 2005 (KR) .................. 10-2005-0115585

(51) Int. Cl.
*H04N 13/04* (2006.01)
(52) U.S. Cl. .................. 348/51; 348/46; 348/54
(58) Field of Classification Search ............ 348/46, 348/51, 54
See application file for complete search history.

(56) References Cited

U.S. PATENT DOCUMENTS

| | | | |
|---|---|---|---|
| 5,315,377 A | 5/1994 | Isono et al. | |
| 5,917,562 A * | 6/1999 | Woodgate et al. | 349/15 |
| 6,094,216 A * | 7/2000 | Taniguchi et al. | 348/51 |
| 6,449,090 B1 * | 9/2002 | Omar et al. | 359/465 |
| 7,359,105 B2 * | 4/2008 | Jacobs et al. | 359/245 |
| 7,411,640 B2 * | 8/2008 | Uehara et al. | 349/95 |
| 7,423,796 B2 * | 9/2008 | Woodgate et al. | 359/237 |
| 7,796,318 B2 * | 9/2010 | Woodgate et al. | 359/237 |
| 7,868,952 B2 * | 1/2011 | Fukushima et al. | 349/15 |
| 2005/0057704 A1 | 3/2005 | Ootake et al. | |
| 2006/0098281 A1 | 5/2006 | Fukushima et al. | |
| 2006/0284972 A1 * | 12/2006 | Aoki et al. | 348/51 |

FOREIGN PATENT DOCUMENTS

| | | |
|---|---|---|
| CN | 1576953 A | 2/2005 |
| EP | 0 744 872 A2 | 11/1996 |
| EP | 0 744 872 A3 | 7/1997 |
| EP | 0 833 183 A1 | 4/1998 |
| EP | 1 650 983 A1 | 4/2006 |
| JP | 03-119889 | 5/1991 |
| JP | 08-076139 | 3/1996 |
| JP | 9-138370 | 5/1997 |

(Continued)

OTHER PUBLICATIONS

Patent Abstracts of Japan, Publication No. 09-138370; Date of Publication: May 27, 1997; in the name of Atsuhiro Yamashita.

(Continued)

*Primary Examiner* — Michael Won
(74) *Attorney, Agent, or Firm* — Christie, Parker & Hale, LLP (57) ABSTRACT

A three-dimensional display device includes an image display portion displaying a left eye image and a right eye image; and a parallax barrier facing the image display portion and directing the left eye image and the right eye image displayed by the image display portion towards a left eye and a right eye of a user, respectively.
The parallax barrier may be formed with a liquid crystal display of a normally black mode of transmission.

14 Claims, 5 Drawing Sheets

FOREIGN PATENT DOCUMENTS

| | | |
|---|---|---|
| JP | 10-142572 | 5/1998 |
| KR | 10-2004-0104662 | 12/2004 |
| KR | 10-2005-0062615 | 6/2005 |
| KR | 10-2005-0086222 | 8/2005 |

OTHER PUBLICATIONS

Office Action dated Jul. 18, 2007 for corresponding European Patent Application No. 06 125 068.4-2202.

SIPO Office action dated Nov. 27, 2009, for corresponding Chinese application 200610160847.1, noting listed references in this IDS.

European Search Report dated Feb. 21, 2007, for EP 061250683.4, in the name of Samsung SDI Co., Ltd.

Korean Patent Abstracts, Publication Number: 1020050086222 A; Publication Date: Aug. 30, 2005; in the name of Jang et al.

* cited by examiner

THREE-DIMENSIONAL DISPLAY DEVICE

CROSS-REFERENCE TO RELATED APPLICATION

This application claims priority to and the benefit of Korean Patent Application No. 10-2005-0115585, filed in the Korean Intellectual Property Office, on Nov. 30, 2005, the entire content of which is incorporated herein by reference.

BACKGROUND OF THE INVENTION

1. Field of the Invention

The present invention relates to a three-dimensional display device, and in particular, to an autostereoscopic three-dimensional display device using a parallax barrier.

2. Description of the Related Art

A three-dimensional display device may be categorized as a stereoscopic display device where a user should wear viewing aids such as polarizing glasses, or an autostereoscopic display device where the user can see a desired three-dimensional image without wearing such viewing aids.

A common autostereoscopic display device utilizes an optical separation element, such as a lenticular lens, a parallax barrier, or a microlens array, to spatially separate or isolate the left-eye image part and the right-eye image part displayed at an image display unit in the directions of the left and right eyes of the user, respectively.

In particular, the parallax barrier may be formed with a liquid crystal shutter utilizing a transmission type of liquid crystal display, and in this case, it may be converted between a two-dimensional mode and a three-dimensional mode. Thus the parallax barrier can be applied to laptop computers or cellular phones.

Generally, the parallax barrier includes stripe-shaped light interception portions and light transmission portions. It selectively separates left and right eye images displayed at the image display unit through the light transmission portions such that the left and right eye images are respectively provided to the left and right eyes of the user.

A common three-dimensional display device having a parallax barrier displays left and right eye images according to left and right image signals inputted to pixels of the image display portion, and it separates the left and right eye images spatially by using the parallax barrier.

However, since the left and right images are entered into the respective eyes of the user, the resolution of a three-dimensional image is no more than half as fine as that of a two-dimensional image.

To solve this problem, a time-sharing type of three-dimensional display device has been developed.

An image display portion of the time-sharing type of three-dimensional display device, shows patterns of left and right eye images, and the patterns of the left and right eye images are changed alternately at a regular frequency. Patterns of the light interception portions and the light transmission portions of the parallax barrier are changed alternately according to the regular frequency.

Consequently, the time-sharing type of three-dimensional display device provides a three-dimensional image having a resolution equal to that of a two-dimensional image.

The time-sharing type of three-dimensional display device can provide relatively high quality three-dimensional images with high resolution compared to images produced by the spatial separating type of three-dimensional display device.

However, when the parallax barrier is formed with a liquid crystal display, an aperture ratio of the parallax barrier may have a value of more than 50% due to structural limitations of the liquid crystal display.

That is, when the aperture ratio of the parallax barrier becomes too large (i.e., more than 50%), cross talk between a left eye image and a right eye image separated by the parallax barrier may result.

Thus, the quality of a three-dimensional image provided by the time-sharing type of three-dimensional display device may be deteriorated.

SUMMARY OF THE INVENTION

It is an aspect of the present invention to provide a three-dimensional display device that can provide three-dimensional images that have high resolution and high quality.

In exemplary embodiments according to the present invention, a three-dimensional display device with one or more of the following features is provided.

A three-dimensional display device includes an image display portion adapted to display a left eye image and a right eye image and a parallax barrier facing the image display portion and adapted to direct the left eye image and the right eye image displayed by the image display portion toward a left eye and a right eye of a user, respectively.

The parallax barrier may be formed with a liquid crystal display of a normally black mode of transmission.

The parallax barrier may include a first substrate, a plurality of first electrodes extending along a first direction and located on the first substrate, a plurality of second electrodes located between the first electrodes, a second substrate facing the first substrate, a third electrode located on the second substrate, a liquid crystal layer located between the first substrate and the second substrate, a first polarizing plate located on an outer surface of the first substrate, and a second polarizing plate located on an outer surface of the second substrate.

Each of the first electrodes and each of the second electrodes are configured to have widths substantially equal to each other. Gaps formed between the first electrodes and the second electrodes are of a substantially equal width.

The third electrode may be formed as a single-body electrode.

The image display portion may include a plurality of first pixels and a plurality of second pixels arranged alternately and repeatedly according to a pattern formed by the first electrodes and the second electrodes.

During a first period, a driving voltage may be applied to the first electrodes.

The left eye image may be displayed by the first pixels.

The right eye image may be displayed by the second pixels during the first period.

During a second period, the driving voltage may be applied to the second electrodes, and the right eye image may be displayed by the first pixels.

The left eye image may be displayed by the second pixels during the second period.

The left eye image and the right eye image may be displayed in a time-shared manner.

According to the present invention, a time-sharing type of three-dimensional display device can provide high resolution and prevent the deterioration of the quality of a three-dimensional image by using a parallax barrier formed with a liquid crystal display of a normally black mode of transmission.

DETAILED DESCRIPTION

The present invention will be described more fully hereinafter with reference to the accompanying drawings, in which certain exemplary embodiments of the present invention are shown.

Figure 1:
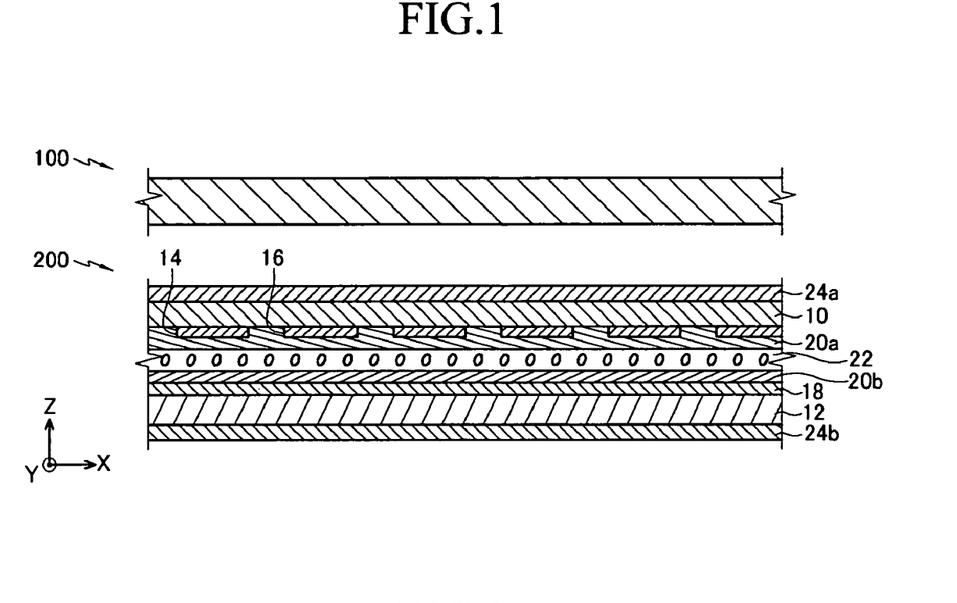
FIG. 1 is a sectional view of a three-dimensional display device according to a first exemplary embodiment of the present invention.

FIG. 1 is a sectional view of a three-dimensional display device according to a first exemplary embodiment of the present invention.

As shown in FIG. 1, the three-dimensional display device includes an image display portion 100 and a parallax barrier 200.

The image display portion 100 displays a left eye image and a right eye image having a certain or predetermined pattern.

A first image and a second image that have different patterns of the left eye image and the right eye image, are displayed alternately on the image display portion 100 at a frequency, which may be predetermined.

Any suitable display device may be used as the image display portion 100. For instance, the image display portion 100 may be formed with a cathode ray tube, a liquid crystal display, a plasma display panel, a field emission display device, an organic electroluminescence display device, or any other suitable display device(s).

The parallax barrier 200 may be formed with a liquid crystal display of a normally black mode of transmission, which intercepts light when no voltage is applied.

More specifically, the parallax barrier 200 includes a first substrate 10 and a second substrate 12 facing each other.

The first substrate 10 and the second substrate 12 may be formed with a glass substrate having a rectangular shape.

Electrodes are arranged on respective inner surfaces of the first substrate 10 and the second substrate 12 and operate a liquid crystal layer 22 located between the first substrate 10 and the second substrate 12.

First electrodes 14 and second electrodes 16 are located on the first substrate 10. A third electrode 18 is located on the second substrate 12. In one embodiment, the third electrode is formed as a single-body electrode.

In addition, a pair of alignment layers 20a and 20b covering the first and the second electrode 14 and 16 and the third electrode 18 are formed (or arranged) on or at the first substrate 10 and the second substrate 12, respectively.

The electrodes 14, 16, and 18 may be formed with a transparent material such as Indium Tin Oxide (ITO).

A polarizing plate 24a may be located on or at the outer surface of the first substrate 10, and a polarizing plate 24b may be located on or at the outer surface of the second substrate 12.

The structures of the first electrode 14 and the second electrode 16 will be described hereinafter in more detail.

Figure 2:
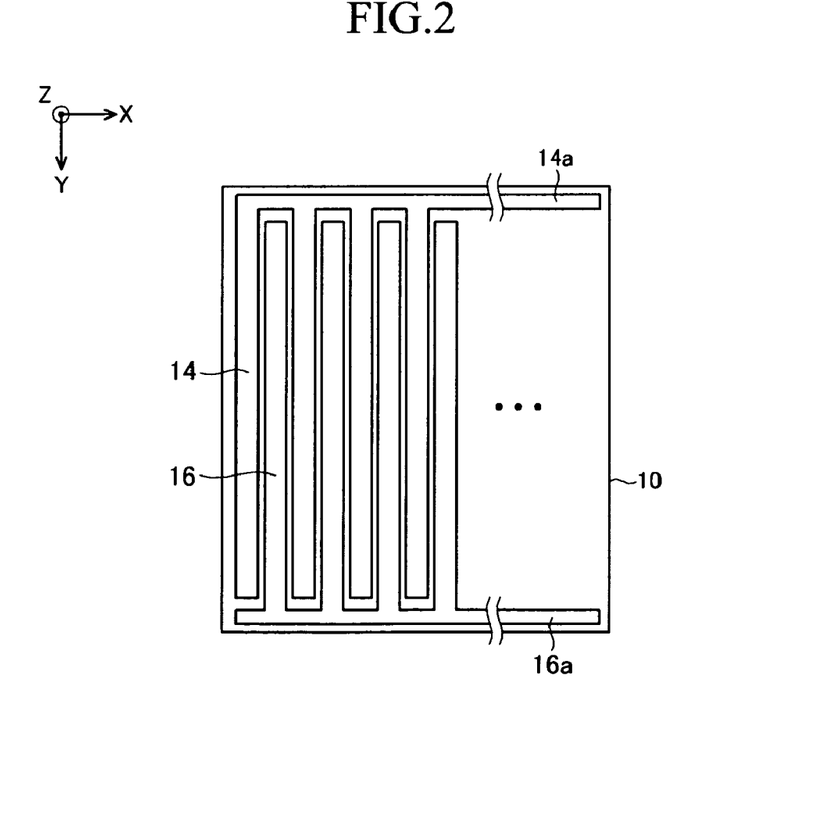
FIG. 2 is a plan view of a parallax barrier of the first exemplary embodiment of the present invention.

FIG. 2 shows structures of the first electrode 14 and the second electrode 16 located on the first substrate 10 in the first exemplary embodiment of the present invention.

As shown in FIG. 2, the first electrodes 14 located on the first substrate 10 extend along a direction corresponding to a longer edge of the first substrate 10 (the direction of the Y-axis in FIG. 2).

The first electrodes 14 are arranged in a striped pattern on the first substrate 10.

A first connection electrode 14a electrically connecting the first electrodes 14 extends along a direction corresponding to a shorter edge of the first substrate 10 (the direction of the X-axis in FIG. 2) and is connected to respective ends of each of the first electrodes 14.

In a substantially similar way as the first electrodes 14 and the first connection electrode 14a are arranged, the second electrodes 16 and a second connection electrode 16a electrically connecting the second electrodes 16 are arranged on the first substrate 10.

In more detail, the second electrodes 16 located on the first substrate 10 extend along the direction corresponding to the longer edge of the first substrate 10 (the direction of the Y-axis in FIG. 2).

The second electrodes 16 are located between the first electrodes 14 in a striped pattern.

The second connection electrode 16a extends along the direction corresponding to the shorter edge of the first substrate 10 and is connected to respective ends of each of the second electrodes 16.

Thus, the first electrodes 14 and the second electrodes 16 are alternately and repeatedly arranged along the direction corresponding to the shorter edge of the first substrate 10 (the direction of the X-axis in FIG. 2). A gap G is formed between one of the first electrodes 14 and a corresponding one of the second electrodes 16 (see FIG. 4A, for example).

Pixel arrays and an operation of the image display portion will be described hereinafter in more detail.

Figure 3A:
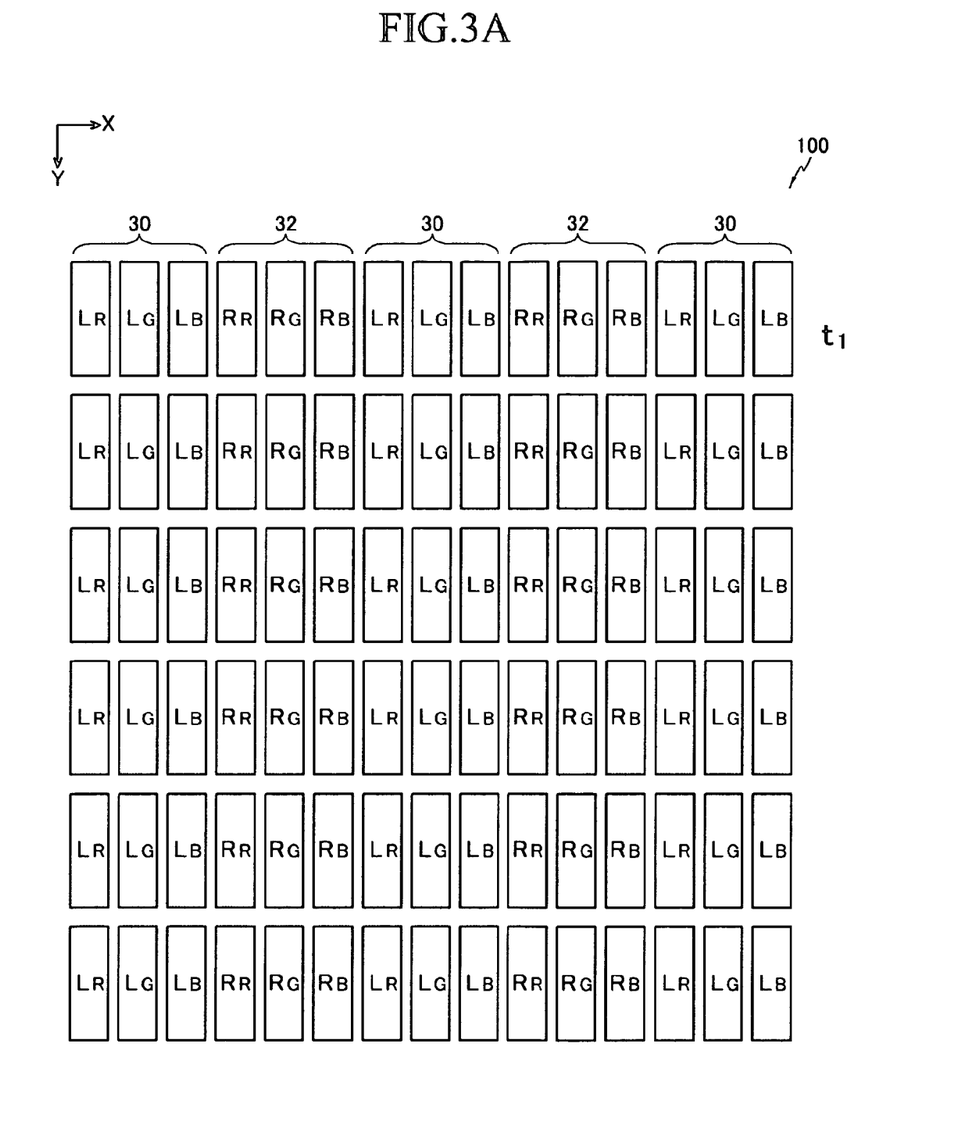
FIG. 3A and FIG. 3B are schematic views of pixel arrays of an image display portion in the first exemplary embodiment of the present invention.
Figure 3B:
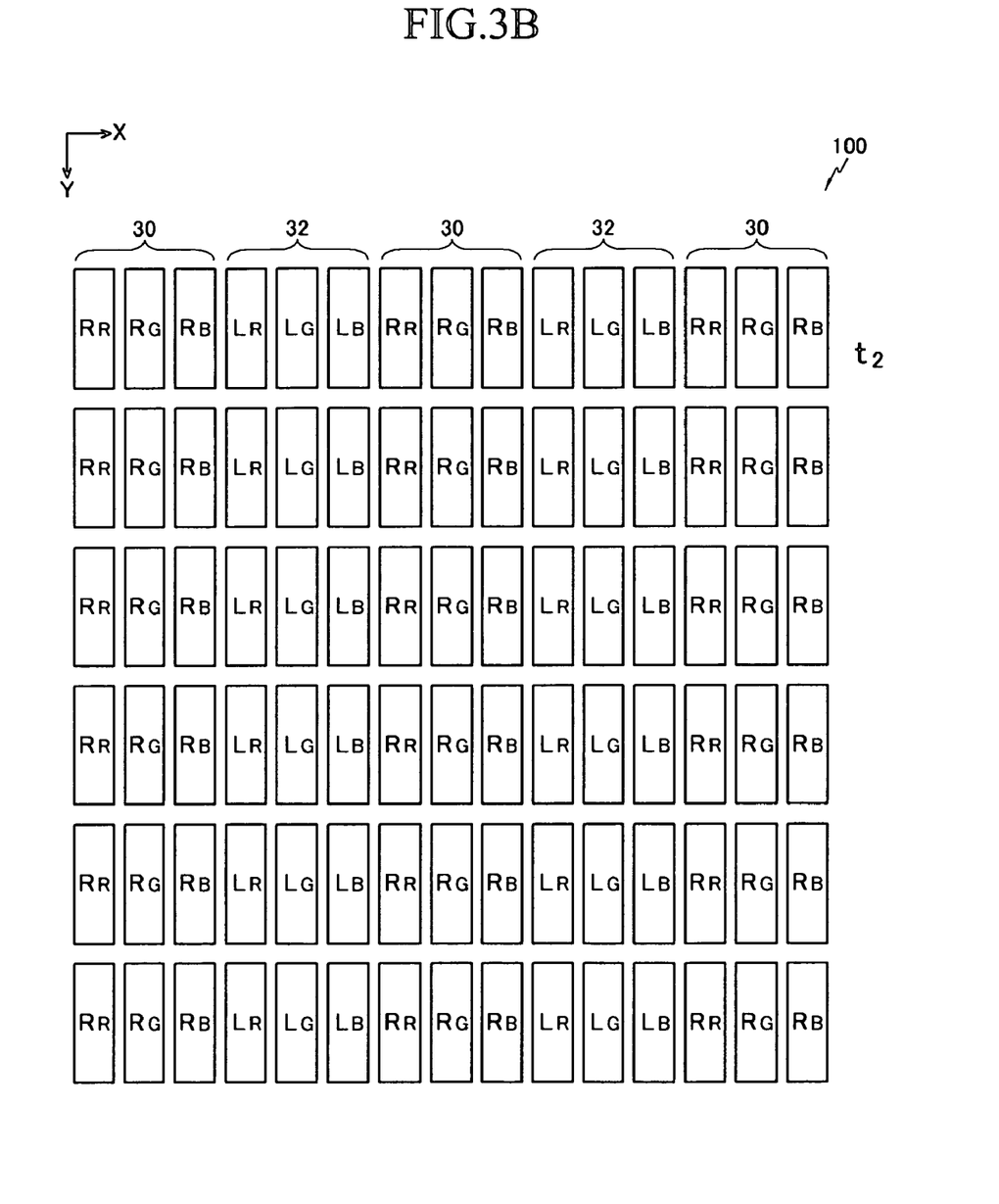

FIG. 3A and FIG. 3B respectively show pixel arrays of the image display portion during a first period $t_1$ and a second period $t_2$.

First pixels 30 and second pixels 32 are arranged along a vertical direction of the image display portion (the direction of the Y-axis in FIG. 3A) and arranged alternately and repeatedly along a horizontal direction of the image display portion (the direction of the X-axis in FIG. 3A).

As shown in FIG. 3A, during the first period $t_1$, the first pixels 30 display left eye images $L_R$, $L_G$, and $L_B$ corresponding to a left eye image signal, and the second pixels 32 display right eye images $R_R$, $R_G$ and $R_B$ corresponding to a right eye image signal. In this way, the first image is displayed on the image display portion during the first period $t_1$.

In the first period $t_1$, a driving voltage is applied to the first electrodes 14 by way of the first connection electrode 14a.

A reference voltage, which by way of example may be a ground voltage, is applied to the second electrodes 16 by way of the second connection electrode 16a. The reference voltage is applied to the third electrode 18.

As shown in FIG. 3B, in the second period $t_2$, the first pixels 30 display right eye images $R_R$, $R_G$, and $R_B$ corresponding to a right eye image signal, and the second pixels 32 display left eye images $L_R$, $L_G$, and $L_B$ corresponding to a left eye image signal.

In this way, the second image is displayed on the image display portion during the second period $t_2$.

In the second period $t_2$, the reference voltage is applied to the first electrodes 14 through the first connection electrode 14a.

The driving voltage is applied to the second electrodes 16 through the second connection electrode 16a. The reference voltage is applied to the third electrode 18.

According to the operation of the image display portion 100 and the parallax barrier 200 as described above, the left eye of a user sees the image displayed by the first pixels 30 during the first period $t_1$ and the image displayed by the second pixels 32 during the second period $t_2$.

The right eye of the user sees the image displayed by the second pixels 32 during the first period $t_1$ and sees the image displayed by the first pixels 30 during the second period $t_2$.

Accordingly, the user can see a three-dimensional image having a resolution that is as fine as a resolution of a two-dimensional image.

As described in more detail below, when the parallax barrier is formed with a liquid crystal display of a normally black mode, the aperture ratio of the parallax barrier does not exceed 50%, and therefore the quality of images produced is not deteriorated due to crosstalk.

The situation described above will be compared with a situation using a liquid crystal display of a normally white mode of transmission.

Figure 4A:
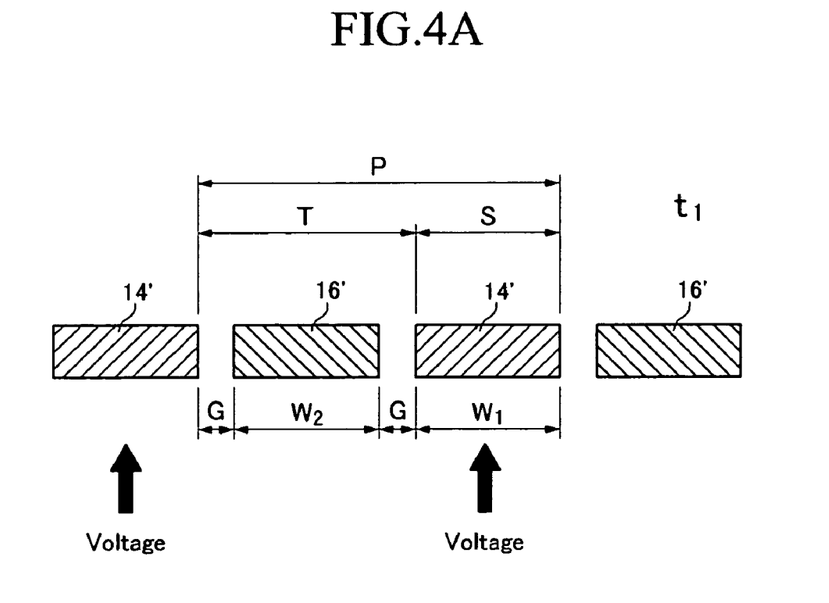
FIG. 4A and FIG. 4B are schematic views showing a light transmission condition when the parallax barrier is formed with a liquid crystal display of a normally white mode of transmission.
Figure 4B:
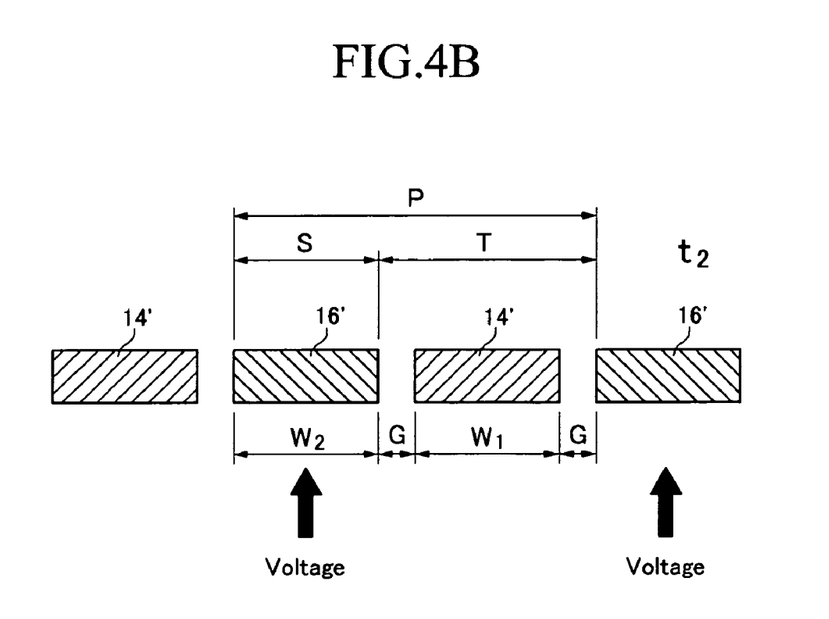
Figure 5A:
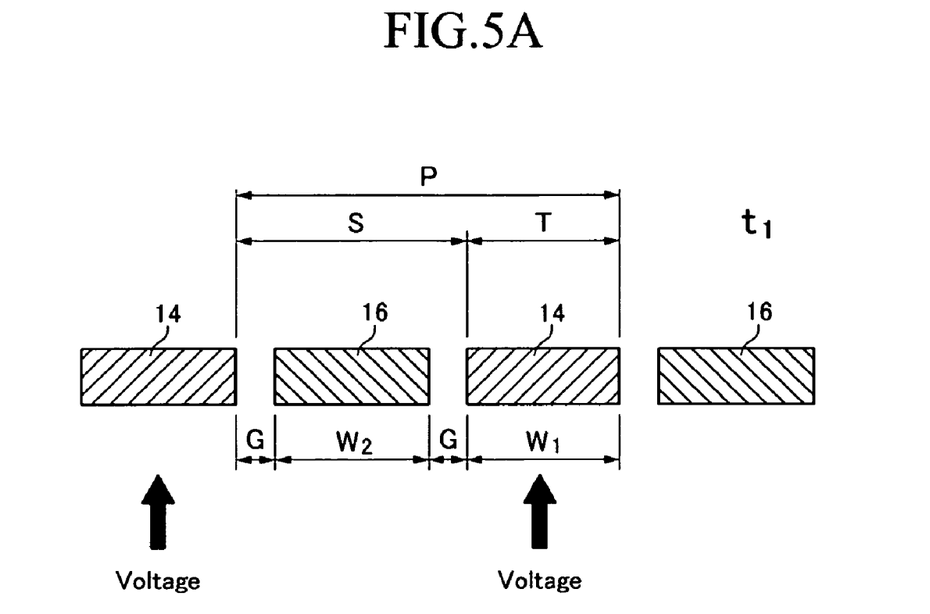
FIG. 5A and FIG. 5B are schematic views showing a light transmission condition when the parallax barrier is formed with a liquid crystal display of a normally black mode of transmission.
Figure 5B:
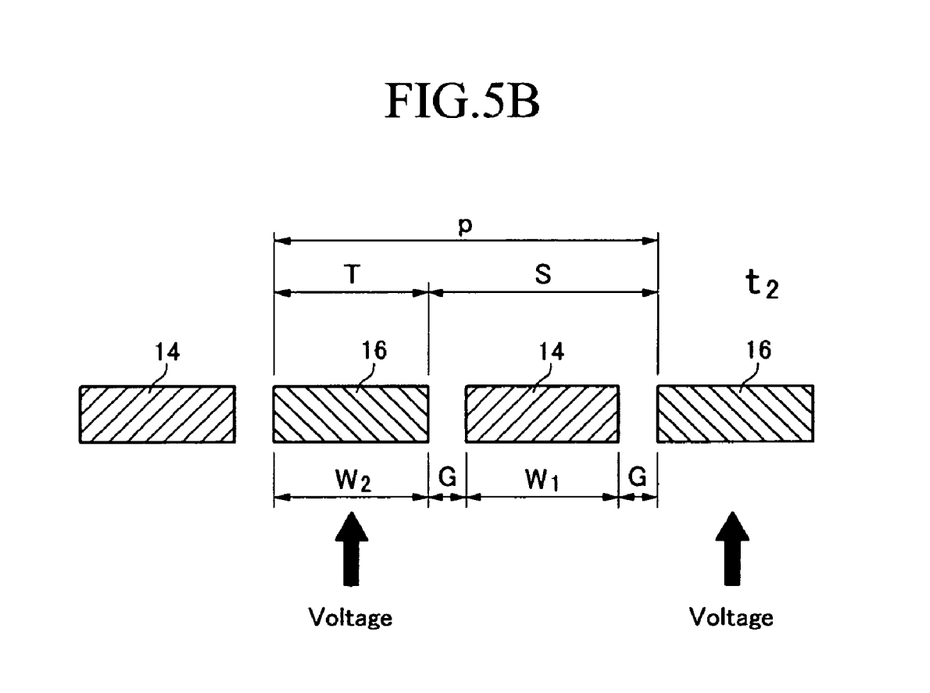

FIG. 4A and FIG. 4B are schematic views showing a light transmission condition when the parallax barrier is formed with a liquid crystal display of a normally white mode of transmission. FIG. 5A and FIG. 5B are schematic views showing a light transmission condition when the parallax barrier is formed with a liquid crystal display of a normally black mode of transmission.

For convenience, like reference numerals corresponding to the first electrodes and the second electrodes that are shown in FIGS. 4A, 4B, 5A and 5B are used and are like or the same as reference numerals used in FIGS. 1 and 2.

As shown in FIGS. 4A, 4B, 5A and 5B, the first electrodes 14, 14' and the second electrodes 16, 16' are repeatedly arranged with a pitch P, which may be predetermined.

In this case, the pitch P includes a width $W_1$ of one electrode of the first electrodes 14, 14' a width $W_2$ of one electrode of the second electrodes 16, 16' and the widths of two consecutive gaps G formed between the first and second electrodes.

In particular, when the three-dimensional display device having a parallax barrier is operated in a time-sharing mode, the parallax barrier should be characterized by equal aperture ratios during the first period $t_1$ and during the second period $t_2$. Accordingly, the width $W_1$ of each of the first electrodes 14, 14' and the width $W_2$ of each of the second electrodes 16, 16' are configured to be substantially equal to each other ($W_1=W_2$), and the widths of the gaps G is are of a substantially equal width.

Under these preconditions, the aperture ratio of the whole parallax barrier can be calculated based on the aperture ratio of one pitch P.

Accordingly, the aperture ratio of the one pitch P will be considered hereinafter in more detail.

Referring to FIG. 4A, in the case that a liquid crystal display of a normally white mode of transmission is used as the parallax barrier, when a driving voltage is applied to the first electrodes 14' during the first period $t_1$, each of the first electrodes 14' becomes a light interception portion S, and each of the second electrodes 16' and each of the gaps G become a light transmission portion T.

Accordingly, an aperture ratio $Ow_1$ of the one pitch P during the first period $t_1$ can be defined as $(W_2+2G)/[2(W+G)]$. Herein, W represents the values both of $W_1$ and of $W_2$, which, as described earlier, are configured to be equal to each other.

Then, as shown in FIG. 4B, when a driving voltage is applied the second electrodes 16' during the second period $t_2$, each of the second electrodes 16' becomes a light interception portion S, and each of the first electrodes 14' and each of the gaps G become a light transmission portion T.

Accordingly, an aperture ratio $Ow_2$ of the one pitch P during the second period $t_2$ can be defined as $(W_1+2G)/[2(W+G)]$. Again, W represents the values both of $W_1$ and of $W_2$, which are configured to be equal to each other.

As described above, when the liquid crystal display in a normally white mode of transmission is used as a parallax barrier, the cumulative length of the light transmission portions is greater than the cumulative length of the light interception portions.

Accordingly, the aperture ratio of the whole parallax barrier, as well as the aperture ratio of one pitch P, is always greater than 50%.

However, in this case, due to a cross talk phenomenon, cross talk between images displayed by the first pixels 30 and images displayed by the second pixels 32 can occur, and therefore the quality of a three-dimensional image that is produced is deteriorated.

To prevent this, a liquid crystal display in a normally black mode of transmission is used as a parallax barrier in the exemplary embodiment of the present invention.

Referring to FIG. 5A and FIG. 5B, in the case that a liquid crystal display in a normally black mode of transmission is used as a parallax barrier, when the driving voltage is applied to the first electrodes 14 during the first period $t_1$, each of the first electrodes 14 becomes a light transmission portion T, and each of the second electrodes 16 and each of the gaps G become a light interception portion S.

Then, when a driving voltage is applied to the second electrodes 16 during the second period $t_2$, each of the second electrodes 16 becomes a light transmission portion T, and each of the first electrodes 14 and each of the gaps G become a light interception portion S.

Accordingly, an aperture ratio $O_{b1}$ of the one pitch P during the first period $t_1$ can be defined as $W_1/[2(W+G)]$. And an aperture ratio $O_{b2}$ of the one pitch P during the second period $t_2$ can be defined as $W_2/[2(W+G)]$. Again, W represents the values both of $W_1$ and of $W_2$ that have same values to each other.

That is, when a liquid crystal display in a normally black mode of transmission is used as a parallax barrier, each of the gaps formed between the first and second electrodes becomes a light interception portion. Thus, the cumulative length of the light interception portions is always greater than the cumulative length of the light transmission portions.

Accordingly, the aperture ratio of the whole parallax barrier, as well as the aperture ratio of one pitch P, is 50% or less.

Thus, in this case, the quality of a three-dimensional image that is produced is not diminished due to the cross talk phenomenon.

When a liquid crystal display in a normally black mode of transmission is used as a parallax barrier, a reduction in brightness of the three-dimensional display device may result. Such a reduction can be compensated by increasing the whole brightness of the device.

By way of example, when a liquid crystal display is used as an image display portion, the brightness of the three-dimensional display device can be increased by increasing the brightness of a back light of the liquid crystal display.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A three-dimensional display device comprising:
an image display portion adapted to display a left eye image and a right eye image; and
a parallax barrier facing the image display portion and adapted to direct the left eye image and the right eye image displayed by the image display portion towards a left eye and a right eye of a user, respectively,
wherein the parallax barrier is formed with a liquid crystal display of a normally black mode of transmission, and
wherein the parallax barrier comprises:
a first substrate;
a plurality of first electrodes extending along a first direction and located on the first substrate; and
a plurality of second electrodes extending along the first direction, located on the first substrate, and located between the first electrodes.

2. The three-dimensional display device of claim 1, wherein the parallax barrier further comprises:
a second substrate facing the first substrate;
a third electrode located on the second substrate;
a liquid crystal layer located between the first substrate and the second substrate;
a first polarizing plate located on an outer surface of the first substrate; and
a second polarizing plate located on an outer surface of the second substrate.

3. The three-dimensional display device of claim 2, wherein each of the first electrodes and each of the second electrodes are configured to have widths substantially equal to each other, and wherein gaps formed between the first electrodes and the second electrodes are of a substantially equal width.

4. The three-dimensional display device of claim 2, wherein the third electrode is formed as a single-body electrode.

5. The three-dimensional display device of claim 2, wherein the image display portion comprises a plurality of first pixels and a plurality of second pixels arranged alternately and repeatedly according to a pattern formed by the first electrodes and the second electrodes,
wherein, during a first period, a driving voltage is applied to the first electrodes, the left eye image is displayed by the first pixels, and the right eye image is displayed by the second pixels, and
wherein, during a second period, the driving voltage is applied to the second electrodes, the right eye image is displayed by the first pixels, and the left eye image is displayed by the second pixels.

6. The three-dimensional display device of claim 2, wherein the parallax barrier has an aperture ratio of less than 50%.

7. The three-dimensional display device of claim 1, wherein an entire brightness of the liquid crystal display is increased to compensate for a reduction of brightness, due to the parallax barrier being formed with a liquid crystal display of a normally black mode of transmission.

8. The three-dimensional display device of claim 1, wherein the left eye image and the right eye image are displayed in a time-shared manner.

9. A three-dimensional display device comprising:
an image display portion adapted to display a left eye image and a right eye image; and
a parallax barrier facing the image display portion and adapted to direct the left eye image and the right eye image displayed by the image display portion towards a left eye and a right eye of a user, respectively,
wherein the parallax barrier comprises:
a first substrate;
a plurality of first electrodes extending along a first direction and located on the first substrate;
a plurality of second electrodes located between the first electrodes;
a second substrate facing the first substrate;
a third electrode located on the second substrate;
a liquid crystal layer located between the first substrate and the second substrate;
a first polarizing plate located on an outer surface of the first substrate; and
a second polarizing plate located on an outer surface of the second substrate, and
wherein the parallax barrier has an aperture ratio of less than 50%.

10. The three-dimensional display device of claim 9, wherein each of the first electrodes and each of the second electrodes are configured to have widths substantially equal to each other, and wherein gaps formed between the first electrodes and the second electrodes are of a substantially equal width.

11. The three-dimensional display device of claim 9, wherein the third electrode is formed as a single-body electrode.

12. The three-dimensional display device of claim 9, wherein the image display portion comprises a plurality of first pixels and a plurality of second pixels arranged alternately and repeatedly according to a pattern formed by the first electrodes and the second electrodes,
wherein, during a first period, a driving voltage is applied to the first electrodes, the left eye image is displayed by the first pixels, and the right eye image is displayed by the second pixels, and
wherein, during a second period, the driving voltage is applied to the second electrodes, the right eye image is displayed by the first pixels, and the left eye image is displayed by the second pixels.

13. The three-dimensional display device of claim 9, wherein the left eye image and the right eye image are displayed in a time-shared manner.

14. The three-dimensional display device of claim 9, wherein a whole brightness of the liquid crystal display is increased to compensate for a reduction of brightness, due to the parallax barrier having the aperture ratio of less than 50%.

* * * * *